Dec. 24, 1968 M. L. RAMME 3,417,825
HELICOPTER ROTOR AND TURBINE ASSEMBLY
Filed May 29, 1967 3 Sheets-Sheet 1
Fig. 1.
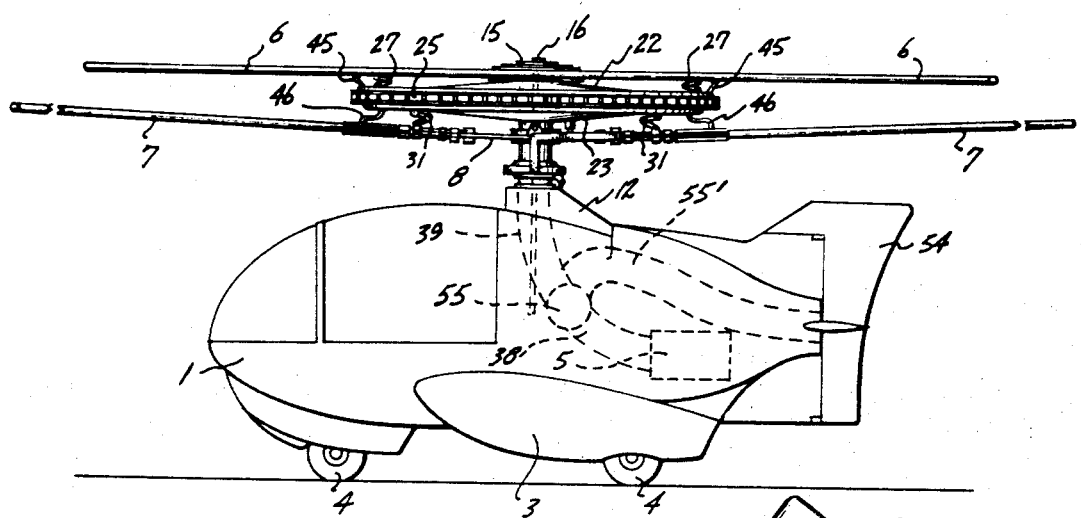
Fig. 2.
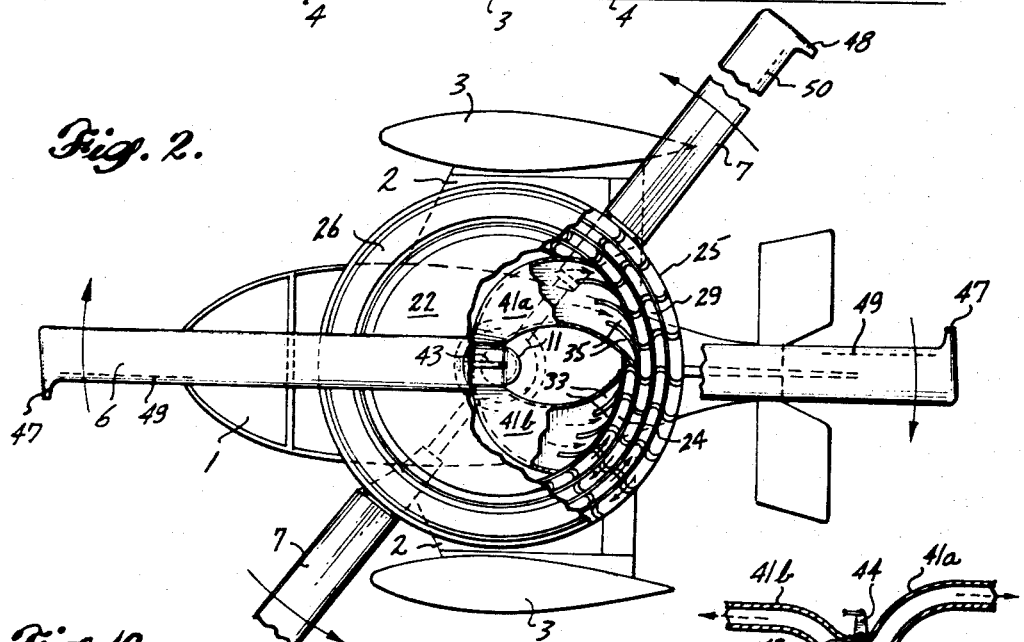
Fig. 10.
Fig. 9.
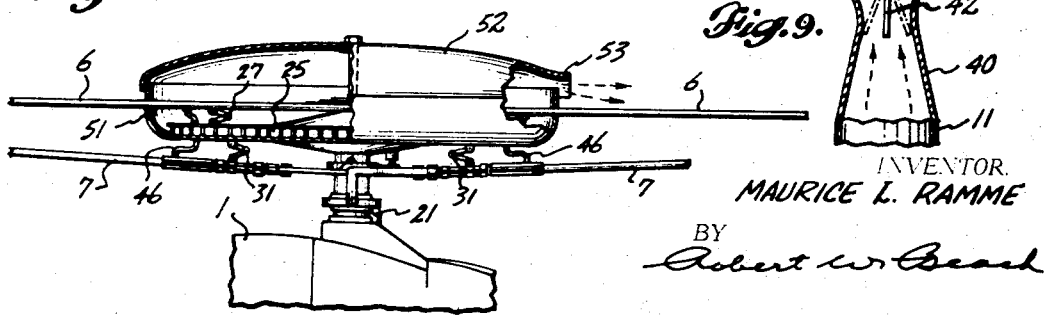
INVENTOR.
MAURICE L. RAMME
BY
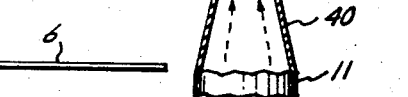
ATTORNEY

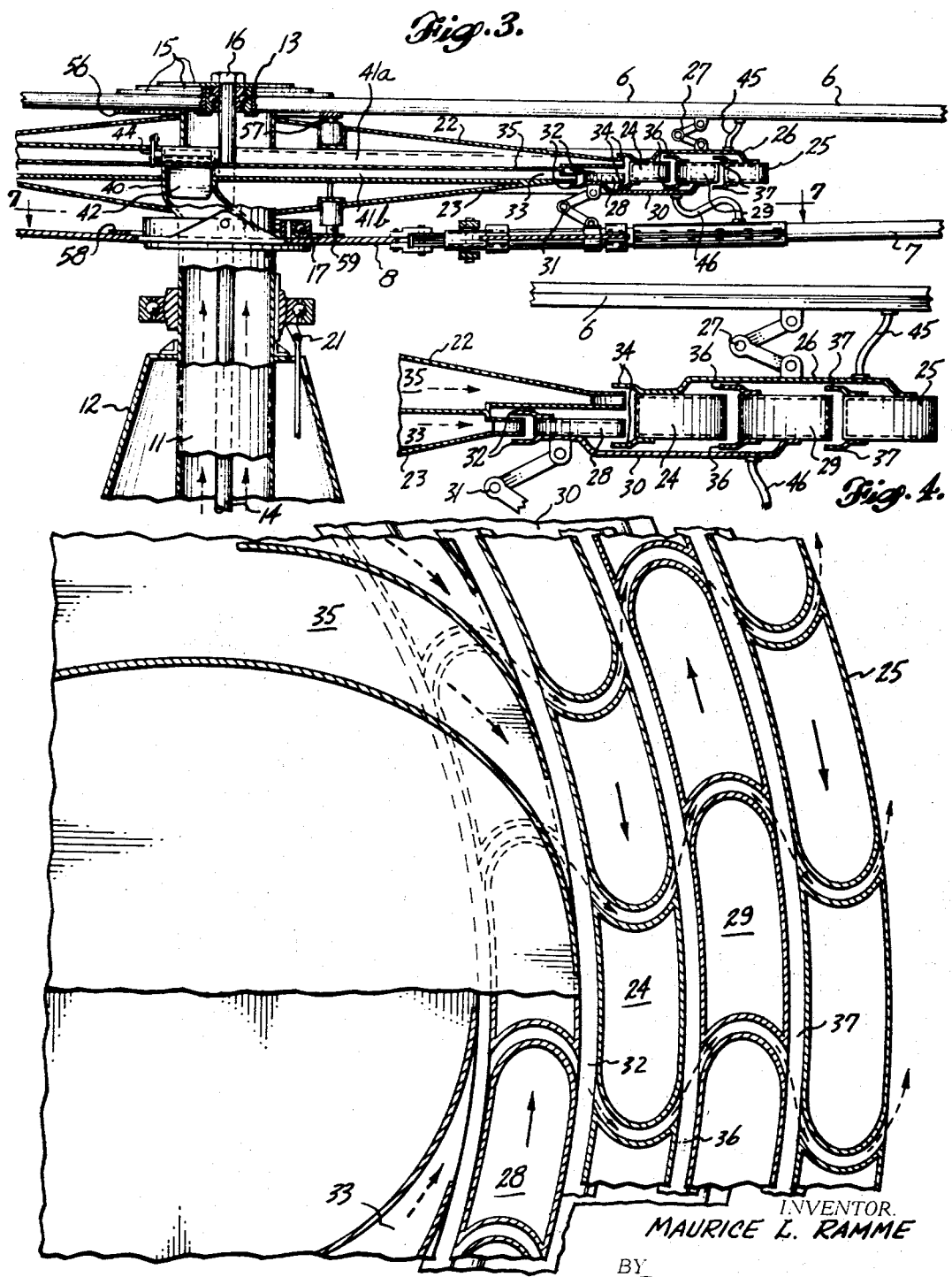

INVENTOR.
MAURICE L. RAMME
BY
ATTORNEY

United States Patent Office 3,417,825
Patented Dec. 24, 1968

3,417,825
HELICOPTER ROTOR AND TURBINE ASSEMBLY
Maurice L. Ramme, 2831 62nd SW.,
Seattle, Wash. 98116
Filed May 29, 1967, Ser. No. 641,836
18 Claims. (Cl. 170—135.28)

ABSTRACT OF THE DISCLOSURE

Between upper and lower contrarotating helicopter rotors is a multistage turbine having unconnected contrarotating turbine wheels rotatively integrated, respectively, with the contrarotating rotors. Turbine engine exhaust gas is supplied to the turbine wheels by nozzles directed in opposite tangential directions, respectively, and the supply of gas to such nozzles can be controlled to balance their opposite thrust reactions or unbalance the reactions for yaw control. Brakes which can be applied independently to the two rotors enable the yaw of the fuselage to be altered during autorotation of the rotors. Spent turbine gas can be collected in a canopy and directed rearwardly to increase thrust and improve yaw control in flight. Gas may be bled from the turbine supply to the rotors for de-icing, boundary layer control and blade tip propulsion, or directed from the rotor turbine to jets on the body for ground or water propulsion.

A principal object of the invention is to increase greatly the propulsion efficiency of helicopter rotors over that achieved by blade tip propulsion, while at the same time utilizing drive which is simple in construction.

It is also an object to provide such an efficient and simple helicopter rotor drive with which can be used conventional pitch and turn mechanism to maneuver the helicopter, both while the rotor is being driven under power and while it is autorotating, without the necessity of utilizing a conventional tail rotor.

Another object is to utilize gas for driving the helicopter rotor assembly which can be discharged at a comparatively low temperature and low velocity.

A more specific object is to provide contrarotating rotors which are driven directly by contrarotating turbine wheels to which equal thrust are applied so that the torque on the fuselage of the opposing thrust reaction components will be balanced. In such apparatus it is a further object to control the supply of gas to the two turbine wheels when desired so as to vary the relative reaction forces of the turbine propulsion jets on the fuselage for the purpoe of controlling yaw of the fuselage.

A further object is to utilize spent turbine gas for the purpose of providing supplemental forward thrust and accelerating the flow of air over directional control surfaces to increase their effectiveness.

Another object is to provide such a contrarotating helicopter rotor arrangement which can be equipped with conventional pitch and turn control mechanism and which can provide both cyclic and collective pitch change.

An additional object is to provide such helicopter rotor drive mechanism which does not require great precision of manufacture or assembly and which does not require close tolerances.

In contrast to the customary practice of rotating helicopter rotors by gearing or by blade tip jets, the aforementioned objects can be accomplished by driving contrarotating helicopter rotors by gas turbine wheels connected, respectively, to such contrarotating rotors. Since the multistage turbine wheels are unconnected they rotate independently. The supply of turbine gas can originate from a gas turbine engine carried by the fuselage and the amount of gas supplied to the two rotor-driving turbine wheels can be altered to control the absolute speed of rotation of the rotors. A canopy arranged above the rotor-driving turbine can collect spent turbine gas and direct it rearwardly to provide additional propulsive effect. It may also be directed downwardly to preserve the effectiveness of a rudder when the forward speed of the helicopter is low or even negligible.

FIGURE 1 is a side elevation of a helicopter equipped with the present invention, parts of which are broken away, and FIGURE 2 is a plan of the helicopter with parts broken away.

FIGURE 3 is an enlarged side elevation of the rotor assembly having parts broken away, and FIGURE 4 is a further enlarged fragmentary elevation of a portion of the rotor and turbine mechanism with parts in section.

FIGURE 5 is an enlarged plan of a portion of the rotor-driving turbine, parts of which are broken away.

FIGURE 9 is a detail elevation with parts in section of gas supply and control construction for the rotor-driving turbine.

FIGURE 10 is an elevation of a modified rotor and turbine assembly with parts broken away.

Figure 6:
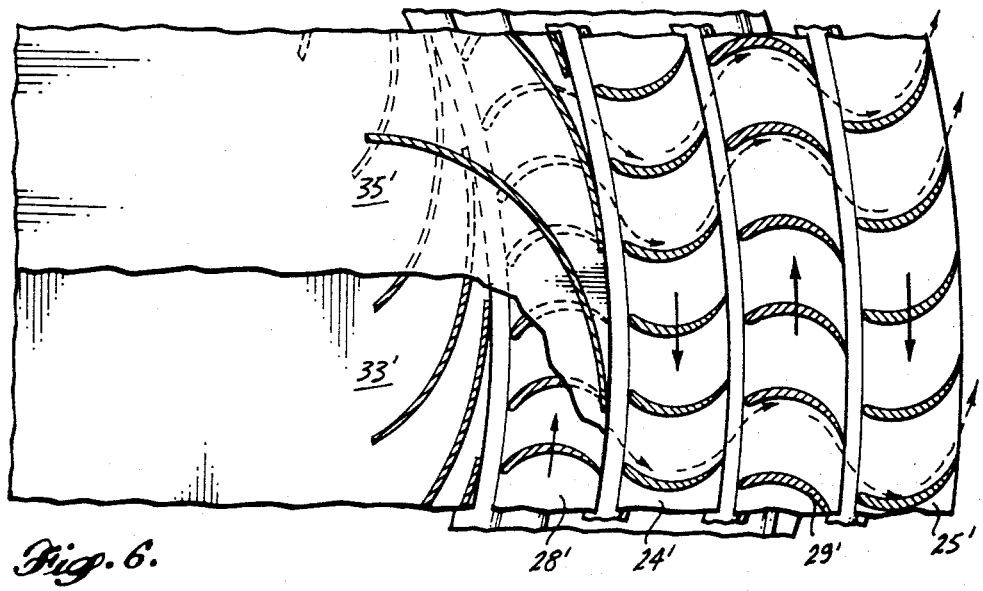
FIGURE 6 is a similar view showing an alternative type of turbine structure with parts broken away.

The essence of the present invention resides in integrating wheels of a multistage turbine with the contrarotating rotors or helicopter suspension blades so as to provide a more direct and efficient rotating mechanism for the helicopter rotors or blades without prejudice to the effectiveness of control of the helicopter. In FIGURES 1 and 2, a representative installation is shown in a helicopter having a fuselage 1 on which the rotor and turbine assembly of the invention is mounted. From opposite sides of the lower portion of the fuselage, stub wings 2 project which carry flotation tanks 3 on their outer ends that may serve as fuel tanks. The fuselage is supported for ground travel by tricycle wheels 4. Th power plant 5 to provide turbine-driving gas may be one or two gas turbine engines. Such an engine can be connected mechanically to drive one or more of the wheels 4 to propel the helicopter over the ground, or ground propulsion can be effected by the thrust of a gas jet from such a gas turbine.

Figure 7:
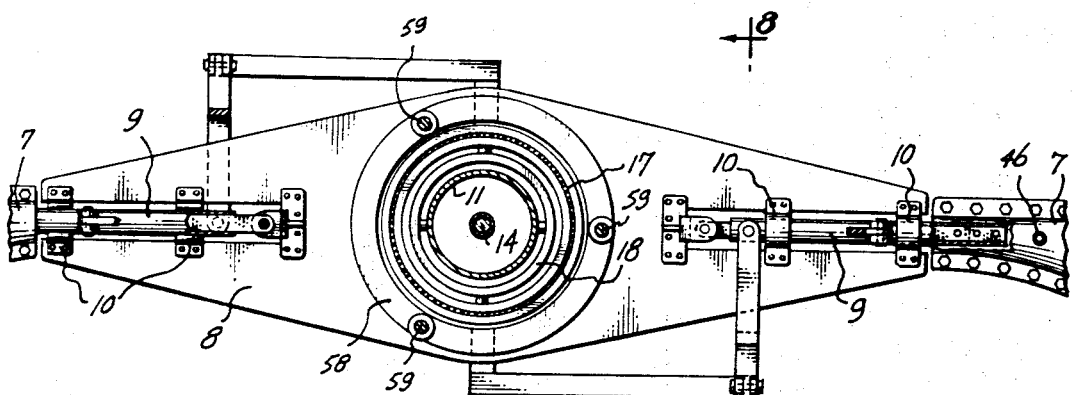
FIGURE 7 is a horizontal section through a portion of the he'icopter rotor taken on line 7—7 of FIGURE 3.
Figure 8:
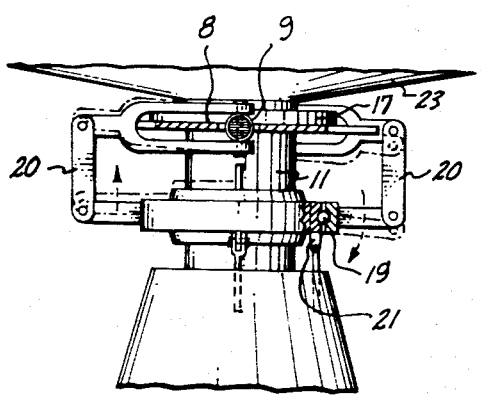
FIGURE 8 is a vertical section on line 8—8 of FIGURE 7.

While different blade arrangements may be utilized for the contrarotating rotor, it is preferred that the upper blade 6 be rigid and straight, that is, that its opposite ends no be disposed at a dihedral angle and that its opposite end portions be of fixed pitch. The opposite blades 7 of the lower rotor, on the contrary, are connected by a plate 8 and may be disposed at a slight dihedral angle to each other, as shown in FIGURE 1. Also, such blades are mounted on the plate 8 by shafts 9 mounted in radial needle bearings 10, so that their pitch can be adjusted both cyclicly and collectively by conventional pitch-adjusting mechanism, as seen in FIGURE 7.

The contrarotating rotors 6 and 7 are mounted on an upright nonrotative tubular mast 11 shown best in FIGURE 3, the lower portion of which can be enclosed in a cowling 12. The upper rotor 6 is rotatively mounted by a radial and thrust bearing 13 on the upper end of a stationary shaft 14 extending concentrically through the mast 11. Thrust distribution plates 15 located beneath the head 16 on the upper end of shaft 14 distribute the thrust forces of the upper rotor over a substantial area of its central portion to avoid concentrated loads.

The mounting plate 8 for the lower rotor 7 is supported by a radial and thrust bearing 17 encircling gimbals 18 mounted on the mast 11 so that the mounting plate 8 can tilt universally relative to such mast as it rotates. A tiltable bearing 19 mounted on the mast below the gimbals is connected by yoke linkage 20 to the plate bearing 17. The bearing 19 can be tilted relative to the mast by suitable controls including a rod 21 for the purpose of rotating the blade shafts 9 cyclicly to the rotors rotate to effect directional control of the helicopter. Alternatively or additionally, the bearing 19 can be shifted elevationally along the mast 11 for the purpose of increasing or decreasing the pitch of the blades 7 collectively, effecting ascent or descent of the helicopter.

The contrarotating rotors or helicopter suspension blades 6 and 7 are freely rotatable relative to the mast 11 about a common upright axis and can be driven in opposite directions by contrarotating wheels of a multistage turbine integral with them, respectively, or such rotors will autorotate in opposite directions by movement of the helicopter through the air. As shown in FIGURES 1 and 2 the helicopter suspension blades extend diametrically across the turbine wheels and have free tip portions projecting a substantial distance beyond the peripheries of the turbine wheels. Because the upper rotor 6 is shorter than the lower rotor 7, as indicated in FIGURE 1, such upper rotor will be rotated faster than the lower rotor by application of a given driving force to each of such rotors. FIGURES 3, 4 and 5 show best details of the installation of the contrarotating rotor and multistage turbine assembly.

An upper casing section 22 and a lower casing section 23 are mounted stationarily on the upper end of the mast 11 between the upper and lower rotors, preferably are of flat frustoconical shape and house between them the gas distribution duct work for driving the rotor turbine. Two annular rows of turbine buckets 24 and 25 are connected by a plate 26 in concentric relationship, and such plate in turn is connected to the upper rotor 6 by toggle linkages 27 so that such plate and the turbine bucket rows 24 and 25 are rotatively integrated with the upper rotor.

Additional concentric annular rows of turbine buckets including an inner row 28 and an outer row 29 are carried by a lower annular plate 30 which is rotatively integrated with the lower rotor blades 7 by toggle linkages 31. The inner periphery of the turbine wheel 28 has shroud flanges 32 located alongside the exit of a lower nozzle box 33. The turbine wheel 24 has spaced annular flanges 34 projecting inward from its inner periphery disposed, respectively, alongside an upper portion of an upper nozzle box 35 and beneath the outer discharge periphery of the turbine wheel 28. The turbine wheel 29 has flanges 36 projecting inwardly from its inner periphery, which are disposed along opposite sides of the outer discharge periphery of the turbine wheel 24. The turbine wheel 25 has flanges 37 projecting inwardly from its inner periphery located along opposite sides of the outer discharge periphery of the turbine wheel 29.

The exhaust duct 38 from the gas turbine engine or engines 5 can be connected by a duct 39 to the interior of the hollow mast 11 from which duct 40 branches, as shown in FIGURE 9. This duct divides into two branch ducts 41a connected to the upper nozzle box 35, and 41b connected to the lower nozzle box 33. As shown best in FIGURE 5, the nozzle boxes 33 and 35 discharge gas jets in substantially opposite directions, respectively, generally tangentially of the casing 22, 23 carried by the helicopter mast 11.

As shown in plan in FIGURE 5, the jets from the upper nozzle box 35 are ejected clockwise so that the reaction from these jets produces a torque tending to rotate the mast 11, and consequently, the helicopter fuselage, in a counterclockwise direction. Conversely, the jets from the lower nozzle box 33 are ejected generally counterclockwise so that the reaction from them tends to turn the mast 11, and consequently, the fuselage, in a clockwise direction. The reactions of the jets projected from the nozzle boxes 33 and 35 thus counteract each other, and if their torsional effects are equal, the mast 11 will not be rotated in either direction and the fuselage will not yaw.

For any of various reasons, the reaction forces produced by ejection of the jets from the nozzle boxes 33 and 35 may not be precisely equal. Consequently, in order to trim the helicopter so that the fuselage does not yaw, a trimming valve 42 swingably mounted on a pivot 43 at the junction between the gas supply duct 40 and the branches 41a and 41b may be provided as shown in FIGURE 9. This valve can be swung by applying a force to a valve horn 44 for the purpose of moving the valve toward one or the other of the broken-line positions to adjust the division of flow from the supply duct 40 to the two branches 41a and 41b. By such adjustment, the torsion forces of the helicopter rotor and turbine assembly on the mast 11 in opposite directions can be balanced so that the fuselage 1 will not yaw, or, by appropriate movement of the valve, yaw of the fuselage in one direction or the other and to any desired degree can be effected in opposition to the aerodynamic forces acting on the fuselage which tend to keep it heading on a straight course.

As shown best in FIGURE 5, gas turbine engine exhaust gas which is ejected in a clockwise direction from the upper nozzle box 35 shown in FIGURE 5 passes into the return-bent buckets or passages of the turbine wheel 24, as indicated by the broken-line arrows. Such gas exerts a force to turn the turbine wheel 24 in the direction indicated by the solid-line arrow. During its passage through this turbine wheel, the direction of flow of the gas is altered so that it is discharged from the outer periphery of this wheel generally tangentially in a counterclockwise direction. The gas thus discharged enters the passages of the adjacent turbine wheel 29 which also are of return-bend shape. Consequently, such gas impels the turbine wheel 29 in the direction indicated by the arrow, while, at the same time, the direction of flow of the gas again is reversed so that it is discharged from the outer periphery of the turbine wheel 29 generally tangentially in a clockwise direction. Such gas then enters the buckets or passages of the outer turbine wheel 25. These passages also are of return-bend shape, so that the gas drives this turbine wheel in a clockwise direction as indicated by the arrow and is discharged from its outer periphery generally in a counterclockwise tangential direction.

The gas turbine engine exhaust gas which is supplied to the nozzle box 33 is discharged from its nozzles generally in a counterclockwise tangential direction, as indicated by the dot-dash arrow in the lower portion of FIGURE 5. Such gas enters the buckets or passages of the turbine wheel 28. Since these passages are of return-bend shape, this turbine wheel will be driven in a counterclockwise direction by such gas, and the gas will be discharged from the periphery of this turbine wheel generally in a trol of the fuselage achieved in flight by swinging the trimming valve 42 shown in FIGURE 9 in one direction or the other.

If desired, the direct jet propulsion effect on the helicopter can be increased by adjusting a valve 55 indicated in FIGURE 1 to divert exhaust from the gas turbine engine 5 from the duct 39 leading to the rotor-driving turbine into the duct 55' which discharges directly rearward from the helicopter. In fact, such valve can be adjusted to divert the entire flow of exhausted gas into the duct 55', instead of utilizing any of it for driving the rotor-driving turbine. In such case, the helicopter will be sustained by autorotation of the rotors, and this may be particularly desirable during descent of the helicopter. Alternatively, during descent, the speed of the gas turbine engine 5 can be reduced greatly to minimize the production of exhaust gas, in which case the helicopter again will be sustained by autorotation of the rotors 6 and 7.

When little or no gas is being supplied to the rotor-driving turbine of the helicopter, the valve 42 will not function to control yaw of the fuselage 1. Such control during autorotation of the blades can be effected by providing brake mechanism by which a force can be applied to either of the rotors 6 and 7 for the purpose of producing a force which will cause the helicopter fuselage to yaw in one direction or the other. Thus, in FIGURE 3, a ring 56 is shown mounted underneath the upper rotor 6 with which a brake plunger 57 can be engaged at will. Correspondingly, a lower brake ring 58 is provided on the mounting plate 8 for the lower rotor with which one or more brake plungers 59 can be engaged. Such brake plungers can be actuated by solenoids or fluid pressure cylinders, as may be preferred.

When the helicopter is not in flight, such as being maneuvered on land or water, the brakes 57 and 59 can both be applied to maintain the blades in longitudinal registry and extending longitudinally of the fuselage. Propulsion and steering on the ground can be effected by connection of the gas turbine engine 5 to one or more of the wheels 4, or propulsion can be effected by a gas jet discharged from the duct 55'. For travel on water, the helicopter can be propelled by the jet projected from the duct 55' and the helicopter can be steered by projection of such jet past the rudder 54.

I claim:

1. A helicopter rotor and turbine assembly comprising a turbine having two contrarotating turbine wheels carrying cooperating annular rows of turbine buckets, two contrarotating helicopter suspension blades extending diametrically across said turbine wheels and having free tip portions projecting a substantial distance beyond the peripheries of said turbine wheels, means connecting said helicopter suspension blades for conjoint rotation with said turbine wheels, respectively, and gas jet means disposed inwardly of the peripheries of said turbine wheels for supplying gas to said turbine buckets.

2. The helicopter rotor and turbine assembly defined in claim 1 in which the turbine is of the multistage type including a plurality of turbine wheels rotatively integral with each of the contrarotating helicopter suspension blades.

3. The helicopter rotor and turbine assembly defined in claim 1, and two separate nozzle means for supplying gas to turbine buckets of the two contrarotating turbine wheels, respectively, said two nozzle means being located inwardly from their respective annular rows of turbine buckets.

4. The helicopter rotor and turbine assembly defined in claim 3, in which the two separate nozzle means eject gas in substantially opposite directions, respectively, and means for controlling the relative amounts of gas ejected by the two nozzle means, respectively, for altering the opposed reaction forces produced thereby.

5. The helicopter rotor and turbine assembly defined in claim 4, a source of propulsion gas carried by the helicopter, and means conveying propulsion gas from said gas source to the turbine gas-supplying means and including a main conduit, two branch conduits branching from said main conduit and valve means movable to vary the relative openings through said branch conduits for altering the relative amounts of gas discharged by the two nozzle means.

6. The helicopter rotor and turbine assembly defined in claim 1, and flexible connections between the helicopter suspension blades and the turbine wheels enabling relative tilting movement between the suspension blades and the turbine wheels while connecting each helicopter suspension blade with a turbine wheel for conjoint rotation.

7. The helicopter rotor and turbine assembly defined in claim 1, in which the contrarotating helicopter suspension blades include one suspension blade having fixed pitch, and the other suspension blade having variable pitch.

8. The helicopter rotor and turbine assembly defined in claim 1, in which the helicopter suspension blades are hollow, and conduits connecting the turbine and the suspension blades for supplying hot gas from the turbine to the hollows of the suspension blades.

9. The helicopter rotor and turbine assembly defined in claim 8, in which the helicopter suspension blades have slots forward of their trailing edges for discharge of gas therefrom for boundary-layer control.

10. The helicopter rotor and turbine assembly defined in claim 1, and brake means selectively engageable between the helicopter fuselage and each of the helicopter suspension blades for producing a torque on the fuselage resulting from suspension blade rotation for controlling yaw of the fuselage.

11. The helicopter rotor and turbine assembly defined in claim 1, in which the contrarotating helicopter suspension blades are in superposed relationship and the outermost turbine wheel in rotatively integrated with the upper suspension blade, a casing rotatable with the upper suspension blade and located to receive exhaust gas discharged from such outermost turbine wheel, and a stationary canopy covering the upper portion of said casing and including a rearwardly directed outlet for discharge therefrom of gas collected from the outermost turbine wheel.

12. The helicopter rotor and turbine assembly defined in claim 11, and an empennage carried by the rear portion of the fuselage in position for flow past it of gas discharged from the canopy outlet.

13. The helicopter rotor and turbine assembly defined in claim 8, in which one of the helicopter suspension blades has a nozzle at its tip for discharge of gas therefrom to exert a rotating force on such blade.

14. The helicopter rotor and turbine assembly defined in claim 1, in which an annular row of turbine buckets carried by one of the turbine wheels is smaller than and located inwardly from an annular row of turbine buckets carried by the other turbine wheel.

15. The helicopter rotor and turbine assembly defined in claim 1, in which an annular row of turbine buckets of one turbine wheel is located inwardly from and substantially coplanar with an annular row of turbine buckets of the other turbine wheel.

16. The helicopter rotor and turbine assembly defined in claim 1, in which an annular row of turbine buckets of one turbine wheel is located between and substantially coplanar with inner and outer annular rows of turbine buckets of the other turbine wheel.

17. The helicopter rotor and turbine assembly defined in claim 1, in which the means connecting at least one of the suspension blades and a turbine wheel is movable for tilting of such suspension blade relative to such turbine wheel.

clockwise tangential direction. This gas will then enter the return-bent passages in the turbine wheel 24 to exert further force on this wheel, tending to turn it in a clockwise direction. As it moves through the return-bent passages of this wheel, the gas will be redirected so that it is discharged from the outer periphery of the wheel in a general counterclockwise tangential direction. The gas will then pass through the return-bent passages of turbine wheel 29 to drive it in a counterclockwise direction and to be discharged in a general clockwise tangential direction. Finally, the gas passes through the return-bent passages in the turbine wheel 25 to drive this wheel clockwise and to be discharged in a counterclockwise tangential direction.

It will thus be seen that although the gas is discharged from the nozzles of the nozzle box 35 and the nozzle box 33 in generally opposite directions, the gas from the two nozzle boxes will be redirected as it passes outward through the turbine wheels 24, 29 and 25, so that gas from both nozzle boxes is acting to provide cumulative forces rather than opposing forces on the turbine wheels. In each of the turbine wheels 24, 29 and 25, the passages can be partitioned so as to keep the gas from the two nozzle boxes substantially separated, but such construction is not necessary. While there will be some leakage of gas between the adjacent peripheries of the adjacent turbine wheels, the shroud flanges 32, 34, 36 and 37 will deter such leakage. The momentum of the gas discharged from the outer periphery of each turbine wheel will tend to carry the gas into the turbine buckets or passages of the next outer turbine wheel.

As seen best in FIGURES 4 and 5, the turbine wheels 24 and 25 are driven in a clockwise direction, and these are carried by the annular plate 26, which is connected to the rotor 6 by the toggle linkages 27. As these turbine wheels rotate, therefore, they drive the upper rotor 6 in the clockwise direction. Conversely, as shown in FIGURE 5, the turbine wheels 28 and 29 are driven in the counterclockwise direction. Since these turbine wheels are mounted on the annular plate 30, which is connected by toggle linkages 31 to the lower helicopter rotor 7, these turbine wheels drive such rotor in the counterclockwise direction contrary to the direction of rotation of the rotor 6. While the linkages 27 and 31 positively integrate the turbine wheels and the rotor blades for conjoint rotation, they enable relative tilting of the rotor blades and the turbine wheel mounting plates to prevent transmission of bending forces between the helicopter rotor and turbine wheel components.

In FIGURE 6, the upper nozzle box 35' and the lower nozzle box 33' correspond generally to the upper nozzle box 35 and the lower nozzle box 33 shown in FIGURE 5. In this instance, however, more nozzles are shown and, in fact, each of the nozzle boxes may have nozzles extending over a greater or lesser portion of the stationary nozzle box structure, the important consideration being that the nozzles should be of such a shape and aggregate size as to provide jets of the best size and velocity for the quantity of propulsive gas available to be projected through the turbine wheels. Also, the turbine wheels 28', 24', 29', and 25' of FIGURE 6 correspond to the turbine wheels 28, 24, 29 and 25, respectively, shown in FIGURE 5. The difference is that the turbine wheels of FIGURE 6 have their annuli divided only by curved vanes to form buckets, whereas in the turbine wheels 28, 24, 29 and 25, the buckets are formed by relatively small passages spaced circumferentially of the wheels. Again, the design of the buckets for the wheels should be such as to enable the greatest conversion of energy from the exhaust gas into mechanical energy utilized for rotating the turbine wheels and helicopter rotor blades.

Various factors will influence the particular turbine wheel design utilized for the rotor-driving turbine wheels. Such factors include the radius of the turbine wheels, the radial width of each turbine wheel, the number of turbine wheels, the volume of gas turbine engine exhaust gas available, the temperature, the number and arrangement of the discharge nozzles in the nozzle boxes and the size, and consequently, the rotative speed of the helicopter rotor blades. In designing the turbine, the principal objective usually will be to obtain the maximum efficiency from the turbine operation which will be achieved principally by the gas being discharged from the outer periphery of the outer turbine wheel at the lowest possible temperature and velocity. At this point, the gas may simply be wasted into the atmosphere, or part of the gas discharged by the nozzle boxes can be utilized for other purposes.

In FIGURES 3 and 4, a flexible hose 45 is shown as connecting the interior of the upper rotor blade 6 and the space beneath the turbine wheel mounting plate 26. Any gas which escapes upward between the turbine wheels 24 and 29 and between the turbine wheels 29 and 25 can pass through such tube into the interior of the rotor blade. Correspondingly, a flexible hose 46 is shown in FIGURE 3 as connecting the hollow of rotor blade 7 and the space above the plate 30 carrying the turbine wheels 28 and 29. Any gas which escapes between turbine wheels 28 and 24 and between turbine wheels 24 and 29 downward can pass through the hoses 46 to the interior of the blades 7.

The exhaust gas passing through tubes 45 and 46 into the turbine blades 6 and 7 will still be at a reasonably high temperature of several hundred degrees Fahrenheit. The temperature of such gas will at least be great enough to warm the rotor blades sufficiently to prevent ice from accumulating on them, even though the atmospheric temperature may be quite low. Gas thus flowing into the upper rotor blade 6 can be discharged through jet nozzles 47 in the tips of the blade, as shown in FIGURE 2 for the purpose of assisting rotation of the blade. Correspondingly, gas which flows into the lower rotor blades 7 can be discharged from the tip jets 48 to assist in rotating this rotor. Alternatively, some or all of the gas flowing into the upper rotor 6 can be discharged through slots 49 near the trailing edge of the rotor blade for purposes of boundary-layer control, and gas flowing into the lower blades 7 can be discharged through slots 50 near their trailing edges for boundary-layer control.

Instead of the spent rotor drive turbine gas simply being discharged to the atmosphere at the outer periphery of the outer turbine wheel 25 or 25', as discussed in connection with FIGURES 5 and 6, such gas may be collected and utilized further by the structure shown in FIGURE 10, if desired. As has been discussed in connection with FIGURES 3 and 4, the outer turbine wheel 25 is integrated with the upper helicopter rotor 6 for rotation with it. In FIGURE 10, an outer casing 51 is shown encircling the outer turbine wheel 25 and has an open top. The sides of this casing fit closely within the downturned lip of a stationary canopy 52 supported from the central shaft 14 of the rotor-supporting structure. Consequently, all of the spent gas discharged from the outer periphery of the turbine wheel 25 will be confined by the casing 51 and will flow upward from it into the chamber within the canopy 52.

While, as shown in FIGURE 10, the lip of the canopy 52 extends downward into overlapping relationship with the upper edge of the casing 51, the rear portion 53 of the canopy is cut away or bent upward to provide a rearwardly directed opening from the canopy over the upper edge of the rotary casing 51. The gas collected by cooperation of the casing and canopy thus escapes rearwardly from it in a stream which will provide additional forward thrust on the helicopter by jet reaction. In addition, the opening from the canopy can be directed downwardly so that the gas discharged from this opening will flow past the empennage of the helicopter, including the rudder 54, to increase its effectiveness for directional control. Such control will supplement the primary yaw con- 18. The helicopter rotor and turbine assembly defined in claim 1, in which one of the helicopter suspension blades is located above the annular rows of turbine buckets of both turbine wheels and the other suspension blade is located below the annular rows of turbine buckets of both turbine wheels.

References Cited

UNITED STATES PATENTS

| | | | |
|---|---|---|---|
| 2,425,904 | 8/1947 | Vernon | 253—16.5 X |
| 2,835,332 | 5/1958 | Fry | 170—135.28 |
| 2,870,847 | 1/1959 | Fry | 170—135.28 |
| 2,925,129 | 2/1960 | Yuan et al. | 170—135.4 |
| 3,130,942 | 4/1964 | Fradenburg. | |
| 3,140,685 | 7/1964 | Lang | 170—135.26 X |
| 3,327,969 | 6/1967 | Head. | |

FOREIGN PATENTS 409,379  2/1910  France.

EVERETTE A. POWELL, JR., *Primary Examiner.*

U.S. Cl. X.R.

170—135.71, 135.4